Jan. 20, 1970  I. O. MacCONOCHIE  3,491,335
EXCESSIVE TEMPERATURE WARNING SYSTEM
Filed Nov. 26, 1968  2 Sheets-Sheet 1

INVENTOR
IAN O. MAC CONOCHIE

BY

ATTORNEYS

Jan. 20, 1970  I. O. MacCONOCHIE  3,491,335

EXCESSIVE TEMPERATURE WARNING SYSTEM

Filed Nov. 26, 1968  2 Sheets-Sheet 2

INVENTOR
IAN O. MAC CONOCHIE

BY

ATTORNEYS

United States Patent Office 3,491,335
Patented Jan. 20, 1970

3,491,335
EXCESSIVE TEMPERATURE WARNING SYSTEM
Ian O. MacConochie, Hampton, Va., assignor to the United States of America as represented by the Administrator of the National Aeronautics and Space Administration
Continuation-in-part of application Ser. No. 550,083, May 11, 1966. This application Nov. 26, 1968, Ser. No. 784,521
Int. Cl. B60q 1/00; G08b 1/08
U.S. Cl. 340—57                         7 Claims

ABSTRACT OF THE DISCLOSURE

This disclosure concerns a warning system for indicating excessive tire temperature in vehicles having pneumatic tires. One species features a remote radio transmitter activated by a coulomb damped bimetallic temperature sensor and broadcasting a two-staged warning signal. The other species utilizes a bellows heat sensor to control the action of a noisemaker device.

CROSS REFERENCES TO RELATED APPLICATIONS

This application is a continuation-in-part of Ser. No. 550,083, filed May 11, 1966, now abandoned.

ORIGIN OF THE INVENTION

The invention described herein was made by an employee of the United States Government and may be manufactured and used by or for the Government for governmental purposes without the payment of any royalties thereon or therefor.

This invention relates generally to a warning system and more particularly to a warning system for operators of large aircraft or land vehicles of impending danger arising from excessive wheel temperatures.

In the past various devices have been utilized to signal either the pressure or temperature of wheels in various vehicles. For example, the use of a whistle attached to a valve stem in cooperation with the tire pressure has been known to provide an audio signal when the tire pressure exceeded a designated amount. Other devices such as flags that extend from the wheel when the critical pressure or temperature point is approached have been used, as well as systems wherein the temperature is utilized to govern or control a pressure system that is linked with a whistle in the control center of the vehicle being operated. Each of these latter devices requires that the system be closed. That is, there must be a pressure or electrical line between the sensor at the wheel and the operation center. Such systems are cumbersome and require a large number of components which can substantially reduce system reliability.

Obviously, many of the prior art devices are incapable of providing a continuous monitoring of the wheel temperature while keeping the operator apprised of the situation. Especially is this true with wheels on the high performance aircraft of the present day. The wheels of modern aircraft at times during flight encounter extreme temperatures which could cause a failure of the wheel without the pilot or operator having knowledge that the tire had failed and would cause an accident on landing.

In order to overcome the disadvantages of the prior art, the instant invention contemplates the use of a temperature sensor which can be utilized to energize a transmitter that emits a signal to a remote receiver for activation of a warning device.

It is an object of the instant invention to provide a warning system for operators of large vehicles of impending danger from overheating of the wheels.

Another object of this invention is to provide a lightweight miniature warning system that continuously monitors a potentially hazardous condition and signals a remote location when the condition exceeds predetermined limits while avoiding positive connection between the two locations.

A further object of this invention is to provide a sensor for energizing circuits that respectively establish the frequency of signals to be emitted from a transmitter to a remote receiver that controls warning devices.

Still another object of the instant invention is to provide a warning system in which a temperature sensor controls a transmitter that emits a signal to a remote receiver for activating a warning device which indicates the existing condition of a potentially hazardous device.

A still further object of this invention is to provide a sensor, transmitter and antenna with connecting circuitry therefor on a wheel to emit a signal, determined by the temperature of a wheel, that is received by a receiver that activates a warning device near the operator of the vehicle.

Generally, the foregoing and other objects are accomplished by utilizing a bimetallic sensor which moves in accordance with the temperature on the wheel to which it is attached to close, respectively, a primary and a secondary circuit which cause a transmitter to be energized and emit a signal. The signal emitted depends upon whether the secondary circuit has been energized at the time the primary circuit is energized. Closing of the primary circuit energizes the transmitter that emits a signal of predetermined frequency. Excessive temperatures sensed by the bimetallic sensor cause the secondary circuit to be closed which energizes a subcarrier oscillator to modulate the signal and algebraically add the frequencies of the transmitted signal. The receiver at the remote location picks up the signals and when only moderate temperatures have been sensed at the wheel, the receiver activates a warning light. When excessive temperatures are encountered at the wheel and the secondary circuit closed, the receiver picks up the modulated signal and activates a warning speaker.

A more complete appreciation of the invention and many of the attendant advantages thereof will be readily apparent as the same becomes better understood by reference to the following description when considered in connection with the accompanying drawings wherein.

Figure 1:
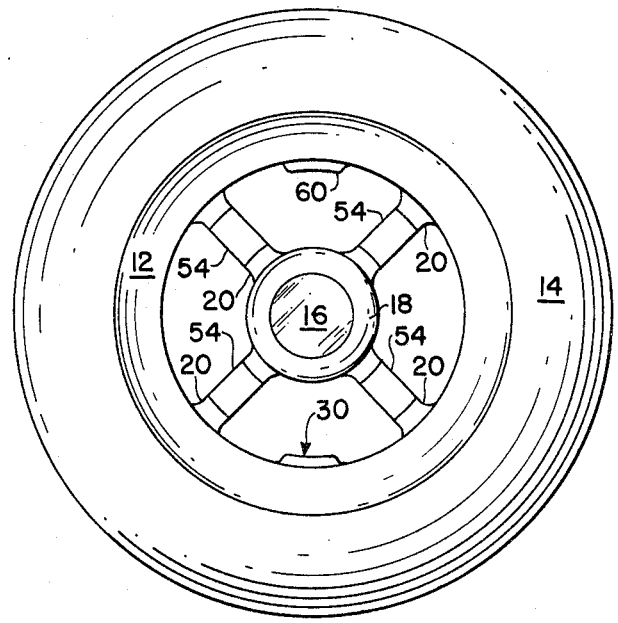
FIG. 1 is a partial elevational view of a wheel incorporating one embodiment of the instant invention.

Referring now to the drawings and more particularly to FIG. 1 wherein wheel 12 is shown to have tire 14 mounted thereon for rotational movement about axle 16. Wheel 12 is supported from axle 16 by hub 18 and spokes 20 or any other conventionally known structure.

Figure 2:
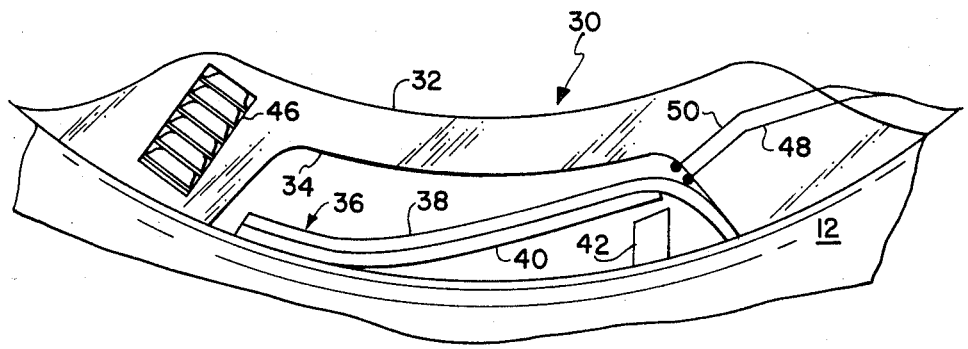
FIG. 2 is an enlarged and partial sectional view of a portion of FIG. 1.

Monitor 30 is mounted on wheel 12 on the interior side thereof and, FIG. 2, includes casing 32 surrounding opening 34. Bimetallic heat sensor 36 is attached to wheel 12 by conventional means (not shown) and includes a least-susceptible-to-heat portion 38 and the most-heat-sensitive portion 40. As shown in FIG. 2, the end of the bimetallic sensor is curved and engages the casing 32, to provide frictional or coulomb damping so that random vibrations impressed on the sensor by the wheel will not falsely trigger the warning signal. The sensor 36 is also mounted so that centrifugal forces will override the temperature-induced movement of the sensor 36 at high rotational speeds, to prevent insidious warnings to the pilot when he is at the point of takeoff. Stop 42 prevents sensor 36 from being forced into more intimate contact with wheel 12 by rotational forces during high speed rotation of wheel 12. As will be described hereinafter, it is necessary to utilize a power source, such for example as battery 46, in order to energize primary circuit 48 and secondary circuit 50.

Figure 3:
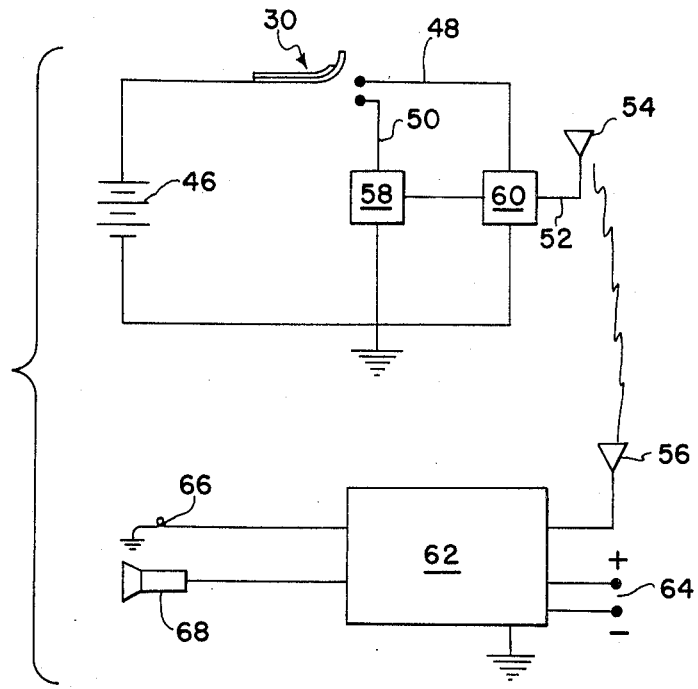
FIG. 3 is a schematic circuit diagram of an embodiment of the instant invention.

Referring now to FIG. 3 wherein a block diagram of an embodiment of the instant invention is shown to include primary circuit 48 which is the initial circuit closed to permit electrical power from battery 46 to flow to and activate transmitter 60. Antenna 54 is connected to transmitter 60 by antenna lead 52. When the portion of sensor 30 in intimate contact with wheel 12 senses excessive temperature, bimetallic sensor 36 arches further and secondary circuit 50 is closed to permit battery 46 to energize subcarrier oscillator 58 which modulates the signal emitted from transmitter 60. Subcarrier oscillator 58 and transmitter 60 are of conventional construction and are well known in the miniature electronics field. It is to be noted from FIG. 1 that a preferable arrangement for the sensor, battery transmitter and subcarrier oscillator are on opposed sides, that is, diametrically opposite one another in order to balance wheel 12. An example of the frequency transmissions of the subcarrier oscillator 58 and transmitter 60 might be in the range of two kilocycles for subcarrier oscillator 58 and 250 megacycles for transmitter 60. These signals would be transmitted through antenna 54 to a remote location as will be described more fully hereinafter.

As indicated in FIG. 3, the remote location would require antenna 56 connected with FM receiver 62 to pick up the signal emitted from transmitter 60. Receiver 62 is powered by source 64 and is connected with warning light 66 and audio warning signal 68.

Figure 4:
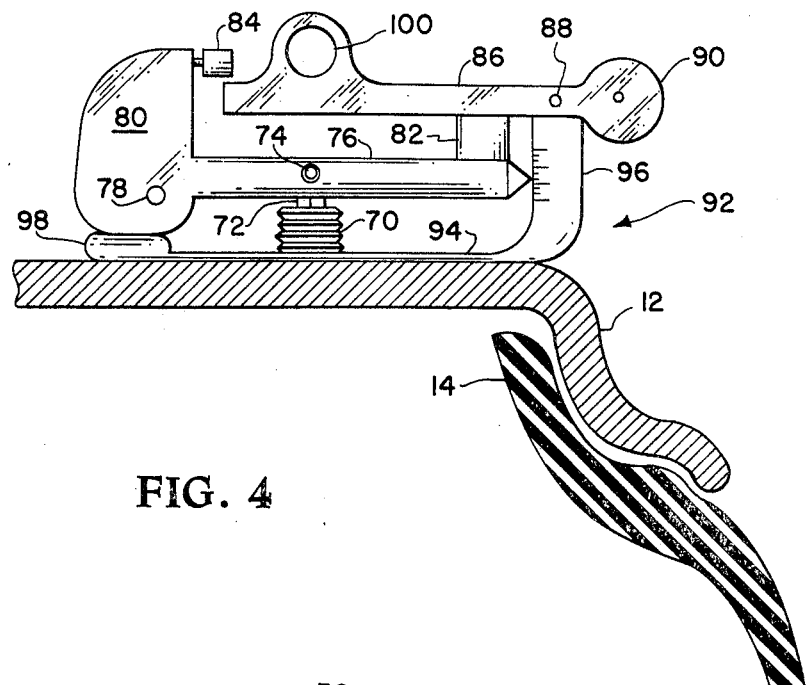
FIG. 4 is a partial cross-sectional elevational view of another embodiment of the instant invention.

Referring now to FIG. 4 wherein an alternative embodiment of the instant invention is shown to include bellows heat sensor 70 attached to force rod 72 pivoted at 74 to lever 76. Lever 76 in turn is pivoted at 78 adjacent counter balance 80. The opposite end of lever 76 has resilient stop 82 mounted thereon for a purpose that will become apparent hereinafter. Adjustable stop 84 is secured to counterbalance 80 to prevent link 86, which is pivoted at 88 to bracket 92, from being prematurely released to activate noisemaker 100. Bracket 92 is mounted on wheel 12 by bracket base 94 which includes link arm 96 to which link 86 is pivoted at 88 and lever arm 98 for attachment of lever 76 about pivot 78.

OPERATION

The embodiment of the invention shown in FIGS. 1–3 may be utilized on aircraft or large articulated land vehicles in order to warn the operator thereof when the wheels or tires are encountering excessive temperatures. For example, wheel 12 is immediately adjacent the brake drums which generally create the greatest amount of heat. Bimetallic strip 36 is in intimate contact along a portion of its length with wheel 12 which contacts the inner tube or air in the tire. The main source of heat, the brake, is generally the cause of the high wheel temperatures and results in high tire temperature which may cause many accidents. In any event, the wheel, due to its intimate contact with the tire, is indicative of tire temperature, and, therefore tire pressure.

At moderate temperatures, bimetallic strip 36 bends under the action of the heat of wheel 12 and closes primary circuit 48. When circuit 48 is closed, transmitter 60 is energized and causes a signal to be sent to receiver 62 in, for example, the cockpit via antenna 54 and 56. Upon receipt of the signal, receiver 62 energizes a warning light 66 on the pilot's instrument panel. If bimetallic sensor 36 senses excessive temperatures, it will advance further with the increase in temperature to energize circuit 50 and subcarrier oscillator 58 which is in that circiut. Subcarrier oscillator 59 modulates the signal emitted from transmitter 60 and received by receiver 62. Receiver 62 which activated light 66, upon receipt of the modulated signal, will activate audio warning signal 68 to thereby warn the pilot or operator of the vehicle that excessive temperatures are present in the wheels and remedial action should be taken.

Referring to FIG. 4, an alternative embodiment of the invention is shown wherein bellows sensor 70 which is in intimate contact with wheel 12 expands when the temperature in the tire increases sufficiently above ambient temperature. Expansion of sensor 70 applies a force to lever 72 to rotate it a small amount in a counterclockwise direction. The counterclockwise movement of lever 76 compresses resilient stop 82 and at the same time adjustable stop 84 is slid from link 86. Thus, it is seen that when the tire temperature has risen sufficiently, link 85 is free to swing clockwise to an outward position such that noise making device 100, for example a whistle, is activated. Obviously, counterbalance 90, because of centrifugal forces, assists in rotating link 86 and noisemaker 100 in a counterclockwise direction. In the inboard position shown in FIG. 4, suitable shields could be utilized to prevent ram air from prematurely activating noisemaker 100.

One aspect of the invention which makes it attractive is the advance state of the art in miniaturization; ruggedness, and shelf life of transmitter and power components. The transmitting and sensing devices lend themselves to being variously located to effect dynamic and static balance of the wheel. Obviously, the monitoring of tire temperature with the above device will warn the pilot or operator when he is using his brakes excessively during taxiing. Also, if the brakes are dragging and causing overheating, he may direct remedial action either to the ground crew before take-off or while in flight where possible. Thus, the instant device will prevent costly tire blowouts and wheel failures in the operation of aircraft or articulated land vehicles and thereby avoid castastrophic accidents. The device may also be of considerable use as a research tool in obtaining data regarding vehicle safety.

Obviously, many modifications and variations of the subject invention are possible in light of the above teachings. For example, a thermistor or button-type thermostat could be used to open and close the circuits to the transmitter and batteries or through the proper circuitry to provide a continuous reading of the temperature of the wheel.

What is claimed as new and desired to be secured by Letters Patent of the United States is:

1. In a warning system, the combination comprising:
   a wheel having transmitter means for broadcasting signals to a remote location;
   means for sensing the temperature of said wheel mounted thereon;
   control means responsive to said sensing means to cause said transmitter to broadcast a first signal when the temperature of said wheel reaches a first level and a second signal upon reaching a higher level;
   receiver means to receive said first and second signals and produce a sensory output in response to each of said first and second signals, whereby first and second sensory outputs are produced successively upon continued heat buildup in said wheel.

2. The warning system of claim 1 wherein said sensing means comprises a bimetallic strip and said control means includes primary circuit means closed by said strip sensing moderately high temperatures of said wheel; and secondary circuit means closed by said strip sensing extreme temperatures of said wheel whereby said transmitter means is respectively activated by said primary and secondary circuits to broadcast a combination of signals to a remote location.

3. The warning system of claim 2 wherein said secondary circuit means includes miniature subcarrier oscillator means for modulating the signal from said transmitter means to said remote receiving means.

4. The warning system of claim 3 wherein said transmitter means and said receiving means include antenna means mounted on said wheel and at said remote location, respectively; a miniaturized power supply mounted with said strip on said wheel opposite said transmitter means to maintain the balance of said wheel; and a second power supply connected with said remote receiving means.

5. In a warning system, the combination comprising:
a wheel mounted for rotation about its axis, heat sensor means producing a force tending to produce movement of an output member in response to temperature increases of said wheel;
means mounting said output member on said wheel with respect to said axis so that centrifugal forces are created tending to oppose said heat sensor means forces;
output means creating a sensory output in response to movement of said output corresponding to excessive temperatures and a predetermined angular velocity of said wheel, whereby a sensory signal indicating excessive wheel temperatures is provided at a desired wheel angular velocity.

6. A warning system comprising:
a wheel mounted for rotation about its axis;
a bimetallic heat sensor element mounted in cantilevered fashion to said wheel;
indicator means providing a sensory output in response to a predetermined movement of the free end of said cantilevered element;
damper means providing damping of the free end of said element, whereby said sensory output will be produced solely by temperature-induced movement of said element and not by vibrations impressed thereon by said wheel.

7. The system of claim 6 wherein said damper means includes a curved portion formed on the free end of said element and a relatively fixed surface frictionally engaging said curved portion to produce coulomb damping while allowing movement of said element.

References Cited

UNITED STATES PATENTS

| | | | |
|---|---|---|---|
| 1,845,049 | 2/1932 | Jarvis. | |
| 2,442,104 | 5/1948 | Twombly | 340—58 X |
| 3,223,969 | 12/1965 | Course | 340—224 X |
| 3,374,460 | 3/1968 | Massoubre | 340—57 X |

JOHN W. CALDWELL, Primary Examiner

D. L. TRAFTON, Assistant Examiner

U.S. Cl. X.R.

200—61.22; 337—1; 340—224, 227.1